2 Sheets—Sheet 1.

P. C. PERKINS.
Wind-Engine.

No. 8,443. Reissued Oct. 8, 1878.

Witnesses:
O. W. Bond
A. H. Adams.

Inventor:
Palmer C. Perkins
By West & Bond Attys.

N. PETERS, PHOTO-LITHOGRAPHER, WASHINGTON, D. C.

P. C. PERKINS.
Wind-Engine.

No. 8,443, Reissued Oct. 8, 1878.

Witnesses:
C. W. Bond
A. H. Adams.

Inventor:
Palmer C. Perkins
By West & Bond Attys.

N. PETERS, PHOTO-LITHOGRAPHER, WASHINGTON, D. C.

UNITED STATES PATENT OFFICE.

PALMER C. PERKINS, OF MISHAWAKA, INDIANA.

IMPROVEMENT IN WIND-ENGINES.

Specification forming part of Letters Patent No. 93,472, dated August 10, 1869; Reissue No. 5,122, dated October 29, 1872; Reissue No. 8,443, dated October 8, 1878; application filed June 4, 1878.

*To all whom it may concern:*

Be it known that I, PALMER C. PERKINS, of Mishawaka, in the county of St. Joseph and State of Indiana, have invented certain new and useful Improvements in Windmills; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

This invention consists, first, in so constructing a windmill that the wind-wheel may be turned on its vertical axis independently of the vane or rudder, causing at the same time a slight elevation or vertical deflection of the latter, so that the weight of the vane will tend to restore the wheel to its normal or operative position; second, in mounting the wind-wheel on one side of the vertical axis in which the mill turns as compared with the line of the wind; third, in the mode of mounting the vane or rudder; fourth, in mechanism for transmitting the power of the wind-wheel; fifth, in combining with a tubular rod or shaft, by which motion is transmitted from the wind-wheel, a rod, chain, or cord, passing through the said tubular rod or shaft, and employed to control or stop the mill; sixth, in the combination and arrangement of devices employed for controlling the position of the wind-wheel relatively to the vane or rudder; seventh, in devices for bracing and adjusting a vertical arbor on which the mill turns.

Figure 1:
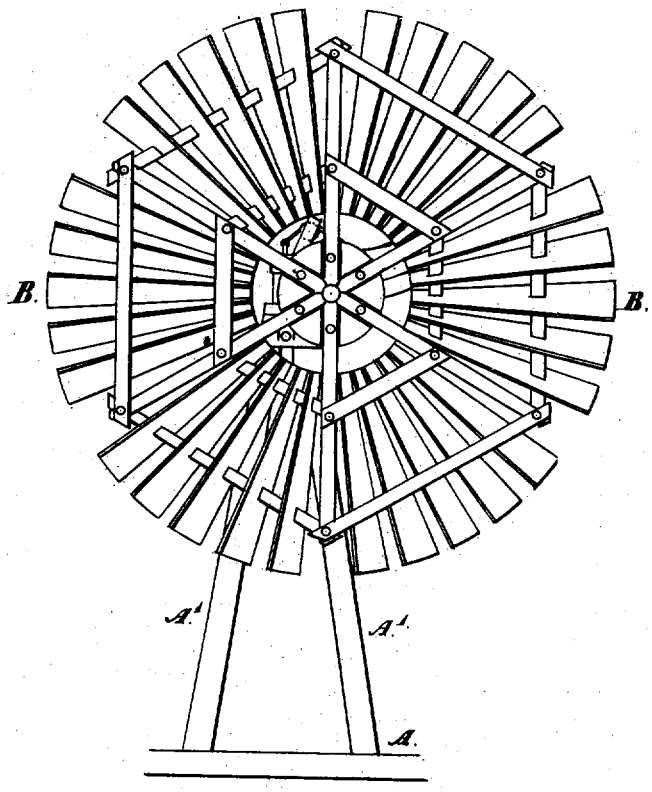
Figure 2:
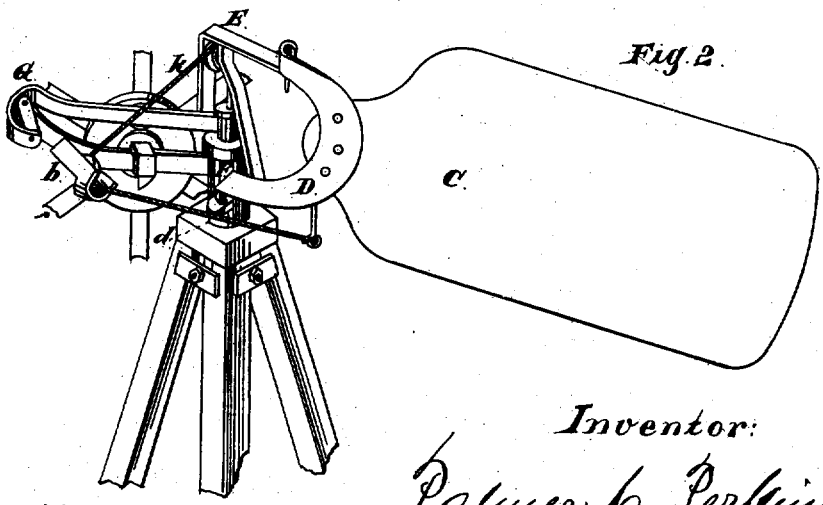
Figure 3:
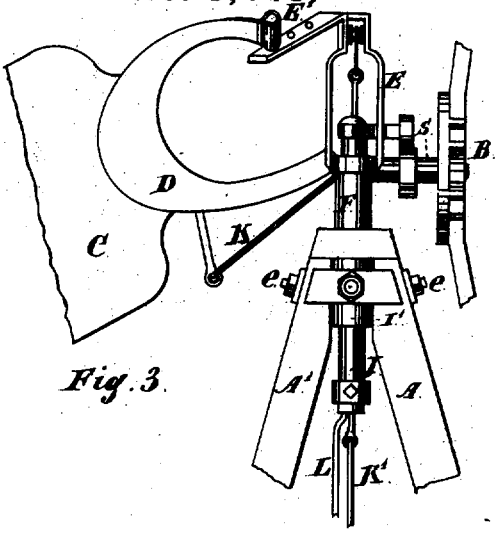
Figure 4:
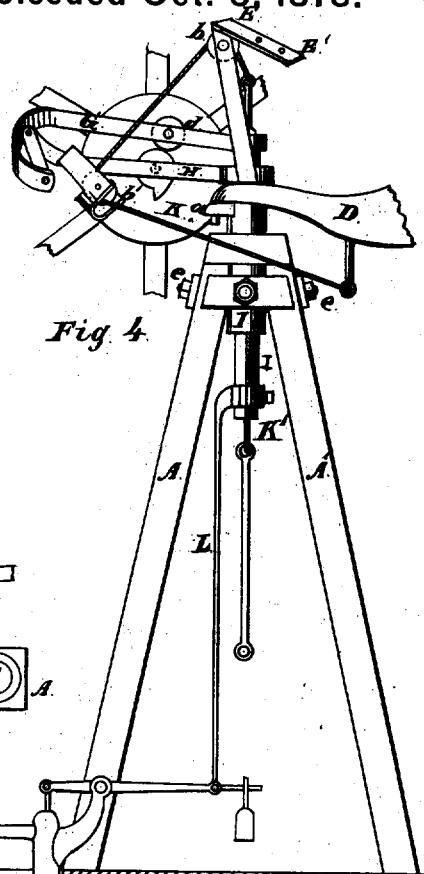
Figure 6:
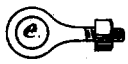
Figure 7:
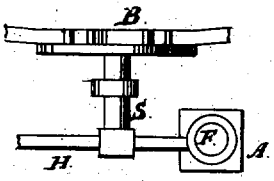
Figure 5:
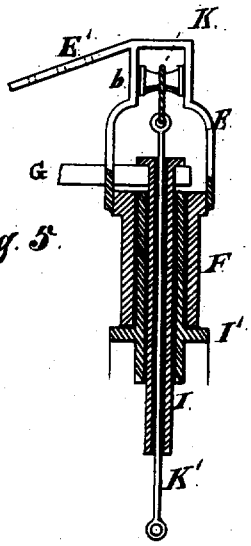

Referring to the drawings, Figure 1 represents a front elevation. Fig. 2 is a perspective view, showing the rudder or vane, the frame to which it is attached, the rope or chain for controlling the relative positions of the wheel and rudder, and various other parts. Fig. 3 is a perspective view taken from the opposite side of the rudder, showing the tube through which the rods pass for the purpose of operating pumps or other devices. Fig. 4 is a side elevation, showing the cam which operates a pump and the way in which such pump may be operated. Fig. 5 is a vertical section on line *x x* of Fig. 3. Fig. 6 is a plan view of one of the eyebolts, which holds the vertical arbor in position on the frame of the machine. Fig. 7 is a detail view.

Corresponding letters represent corresponding parts in the several figures.

A in the drawing represents the base of the machine. A′ A′ represent the posts, which are secured within the base or foundation, of which there may be one or more, they being of any desired length and size.

B represents the wind-wheel, which may be constructed as shown in Fig. 1 of the drawing, or in any other suitable manner. The arms of the wheel are attached in the center to a hub or shaft of any suitable construction, by means of which the wheel is supported and its power transmitted.

In the present illustration the shaft is made short and hollow, running on a stationary arbor, and carrying upon its inner end a cam, which may be cast thereon, or be cast separately, and screwed or bolted thereto in any suitable manner, so that as the wind-wheel is rotated said cam shall come in contact with the under side of a vibrating arm, G, to work the pump.

C represents the rudder or vane, which may be of wood or sheet metal, and of any required size to keep the wind-wheel in proper position.

D represents a frame or yoke, forming one method of hinging the rudder to the mill. As shown, the upper arm of D is hinged to a support or arm, E′, projecting from a standard, E, on the socket F, and the lower arm is hinged to a projection, *d*, upon the socket F. These pivots or hinges on which the vane turns are not located one directly over the other, but are out of line. Therefore the axis on which the vane turns is inclined, causing the outer end to rise by the deflection of the wheel.

This metallic connection may be dispensed with, and strips of wood, with suitable hinges, or a spring or springs which will yield or bend to the extent necessary to allow the wheel and rudder to approach each other, or other suitable connections, may be used, which will cause the outer end of the vane to be elevated by the deflection of the wind-wheel, and permit the vane to return the wheel to its former position, by gravity, when the excessive force of the wind ceases. The arm E′, which holds the upper portion of the frame D, may be perforated with a series of holes, so as to give the outer end of the rudder more or less elevation, by inserting the pivot in the one nearer to or farther from the socket F.

F represents a sleeve or socket, the lower end of which rests upon the upper end of the upright portion of the frame, or upon a plate of metal placed therein, it being so arranged as to turn freely upon the pipe I′, which passes down through the center of it.

H represents an arm or frame secured to the socket F, and projecting laterally therefrom.

G represents a vibrating arm, the inner end of which embraces or is loosely connected with the upper end of the pipe I. The other end is pivoted to the arm or frame H, so that the inner end can freely move up and down with the pipe I. G is operated by means of a cam upon the hub or shaft of the wind-wheel, which cam comes in contact with a roller on a stud upon the arm G. By the movement of this arm G the pipe I and pump-rod are operated.

S is an axle or arm, upon which the wind-wheel is mounted, such axle and wheel being so arranged that the wheel will be to one side of the vertical axis on which the mill turns as compared with the line of the wind.

As a result of placing the wheel to one side of the center, as described, if there is more wind than is necessary to furnish the required amount of power, the socket will turn around and take the wheel partly out of the wind, bringing its face nearer and nearer parallel with the vane as the force of the wind increases, reducing the effective force of the wheel for the time being. At the same time, in consequence of the peculiar manner of connecting the vane, its outer end will be gradually elevated as the wheel approaches it, and when the force of the wind decreases the vane will operate by gravity to return the wheel into the wind.

It will be seen by referring to the drawing that when the parts are in position to receive the greatest effect from the wind the face of the wind-wheel is set at a right angle to the sides of the rudder or vane, or nearly so, and that as the wheel is turned from such position the effect of the wind upon the wheel is regularly diminished, or, in other words, a less amount of force is exerted upon such wheel, and this ratio of diminution is continued until the face of the wheel and the sides of the vane are brought nearly or quite parallel with each other, at which time the effect of the wind upon the wheel, so far as the production of rotary motion thereof is concerned, will have nearly ceased. This feature of the invention is regarded as of great importance, as it makes the mill self-regulating, and thus prevents the possibility of its being injured by the too rapid motion of its parts. It is apparent, however, that the same result may be produced by other and equivalent means.

I represents a pipe or tube, the upper end of which is connected with the vibrating arm G in such manner that the arm can operate freely. This tube I extends downward through the socket F and tube I′, and to its lower end the pump-rod is fastened.

I′ is a tube or pipe, which has a collar on its upper end secured to the top of the frame.

K represents a rope or chain attached to the vane or rudder C, from which point it passes around a pulley or roller, *b′*, attached to the arm or frame H, and from thence to and over the pulley or roller *b* in the frame E, where it may be united to a rod, K′, which passes down through the tube I. This chain and rod furnish a means of controlling the speed of the wheel or stopping it entirely by throwing the wheel partly or wholly out of the wind. A chain may be used instead of the rod K′. This feature of passing the rod or chain K′ through the tube I is important, because the mill can turn without twisting the chain or rod. The pipe I, in fact, forms a part of the pump-rod, and by it motion is transmitted from the wind-wheel to the pump.

L represents a rod, which is to be secured to the lower end of the tube I, and so arranged that its lower end may be connected to the lever of a pump, as shown in Fig. 4, or to any other devices to which it is desirable to give a reciprocating motion. The leading object of the arm G is to give to the upper end of the pump-rod motion on a line nearly vertical.

I have shown and thus far described my improved mill as applicable only to machines or devices requiring a reciprocating motion; but it is equally applicable to those requiring a rotary motion, the only change required in such cases being to insert a hollow shaft in the place now occupied by the tube I, whose outer diameter shall be such as to cause it to turn freely within pipe I′. To the upper end of such shaft a pinion may be attached, which will receive its motion from a gear-wheel placed upon the hub of the wind-wheel or upon the shaft upon which it is mounted, and be so arranged as to mesh into the pinion upon the hollow shaft or into an intermediate wheel, which wheel shall mesh into said pinion. To the lower end of the hollow shaft a gear or pulley may be secured which shall give motion to any machine which it may be desirable to attach it to.

The following is claimed as new:

1. A windmill so constructed and arranged that the wind-wheel, when turned upon its vertical axis and its face brought to a plane parallel or approximately parallel with the vane or rudder, will, when released, return to its normal position by the gravity of the vane, substantially as and for the purpose set forth.

2. A wind-wheel mounted upon an arm or frame at one side of the center of its vertical axis, substantially as and for the purpose set forth.

3. The combination of a wind-wheel and a vane or rudder mounted on separate vertical or nearly vertical axes, one or both of which are not in the same vertical plane as the horizontal axis of the wheel.

4. A vane or rudder so connected with the wheel that its outer end will be elevated when the wheel is thrown partly or wholly out of the wind, and will operate to return the wheel into the wind by the force of gravity.

5. The arm G, pivoted at one end to an arm or frame, H, and having a reciprocating movement by means of suitable mechanical connection with the hub or shaft of the wheel.

6. The combination of a hollow rod or shaft, I, for transmitting motion from the wind-wheel, and a rod, cord, or chain, K′, passing through the said hollow rod or shaft to control the speed of or stop the mill.

7. The combination and arrangement of the rudder C, rod K′, and connecting rope or chain K, the latter passing over one or more pulleys, substantially as and for the purposes specified.

8. The combination of the bolts *e*, pipe I′, and frame A, substantially as and for the purpose specified.

PALMER C. PERKINS.

Witnesses:
E. A. WEST,
O. W. BOND.